United States Patent
Wang et al.

(10) Patent No.: US 9,454,042 B2
(45) Date of Patent: Sep. 27, 2016

(54) FRAME SEALANT AND SEALING METHOD, DISPLAY PANEL AND DISPLAY DEVICE SEALED THEREWITH

(71) Applicant: BOE TECHNOLOGY GROUP CO., LTD., Beijing (CN)

(72) Inventors: Xinxing Wang, Beijing (CN); Jaegeon You, Beijing (CN); Jikai Yao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/375,510

(22) PCT Filed: Nov. 14, 2013

(86) PCT No.: PCT/CN2013/087130
§ 371 (c)(1),
(2) Date: Jul. 30, 2014

(87) PCT Pub. No.: WO2014/173112
PCT Pub. Date: Oct. 30, 2014

(65) Prior Publication Data
US 2015/0301369 A1 Oct. 22, 2015

(30) Foreign Application Priority Data
Apr. 25, 2013 (CN) .......................... 2013 1 0148661

(51) Int. Cl.
| | | |
|---|---|---|
| *C09J 163/00* | (2006.01) | |
| *G02F 1/1339* | (2006.01) | |
| *C09J 5/04* | (2006.01) | |
| *B32B 7/12* | (2006.01) | |
| *B32B 37/10* | (2006.01) | |
| *B32B 37/12* | (2006.01) | |
| *B32B 37/18* | (2006.01) | |
| *C09D 163/00* | (2006.01) | |

(52) U.S. Cl.
CPC .............. *G02F 1/1339* (2013.01); *B32B 7/12* (2013.01); *B32B 37/10* (2013.01); *B32B 37/1284* (2013.01); *B32B 37/18* (2013.01); *C09D 163/00* (2013.01); *C09J 5/04* (2013.01); *C09J 163/00* (2013.01); *B32B 2255/26* (2013.01); *B32B 2457/20* (2013.01); *C09J 2401/00* (2013.01); *C09J 2463/00* (2013.01); *C09J 2463/003* (2013.01)

(58) Field of Classification Search
CPC ..................................... C09J 163/00
See application file for complete search history.

(56) References Cited

U.S. PATENT DOCUMENTS

| | | | |
|---|---|---|---|
| 2007/0173602 A1* | 7/2007 | Brinkman ......... | C08F 222/1006 524/592 |
| 2009/0258985 A1* | 10/2009 | Choi ........................ | C09K 3/10 524/425 |

FOREIGN PATENT DOCUMENTS

| | | |
|---|---|---|
| CN | 101885955 A | 11/2010 |
| CN | 102181106 A | 9/2011 |
| CN | 102585745 A | 7/2012 |
| JP | 10279910 A | 10/1998 |
| WO | 2014173112 A1 | 10/2014 |

OTHER PUBLICATIONS

International Search Report, International Preliminary Report on Patentability and Written Opinion of the International Searching Authority of PCT/CN2013/087130 in Chinese, mailed Feb. 27, 2014.
Written Opinion of the International Searching Authority of PCT/CN2013/087130 in English, mailed Feb. 27, 2014.
International Search Report of the International Searching Authority of PCT/CN2013/087130 in English, mailed Feb. 27, 2014.
English Translation of the International Search Report of PCT/CN2013/087130 published in English on Oct. 30, 2014.

* cited by examiner

*Primary Examiner* — Vickey Nerangis
(74) *Attorney, Agent, or Firm* — Collard & Roe, P.C.

(57) ABSTRACT

A frame sealant and a sealing method, a display panel and a display device containing the frame sealant. A sealing method for a frame sealant comprises: successively coating a water-borne epoxy resin and a solvent-based epoxy resin or successively coating a solvent-based epoxy resin and a water-borne epoxy resin on a first substrate, aligning and pressing the first substrate and a second substrate; or coating a water-borne epoxy resin on a first substrate, coating a solvent-based epoxy resin on a second substrate, and aligning and pressing the two substrates; a first material by which a nano-scale second material is encapsulated is dispersed in the solvent-based epoxy resin, wherein, the first material is a hydrophilic polymeric material and the second material is one which will undergo an exothermic reaction with water. When the frame sealant is pressed, the hydrophilic polymeric material will absorb water and thus be saturated with water, the remaining water will react with the material which undergoes an exothermal reaction with water to generate heat, which will cause the curing of the frame sealant as an internal heat source.

14 Claims, 2 Drawing Sheets

FRAME SEALANT AND SEALING METHOD, DISPLAY PANEL AND DISPLAY DEVICE SEALED THEREWITH

CROSS REFERENCE TO RELATED APPLICATIONS

This application is the National Stage of PCT/CN2013/087130 filed on Nov. 14, 2013, which claims priority under 35 U.S.C. §119 of Chinese Application No. 201310148661.4 filed on Apr. 25, 2013, the disclosure of which is incorporated by reference.

TECHNICAL FIELD

An embodiment of the present invention relates to a frame sealant and a sealing method, a display panel and display device sealed with the frame sealant.

BACKGROUND

A thin film transistor liquid crystal display (TFT-LCD) is one of Active Matrix-LCD's (AM-LCD's). TFT-LCD has advantages on lightness, contrast, energy consume, life cycle, volume and weight. It is highly automatic, low-cost, and suitable for mass production, and it becomes a main product in new century with wide development space. TFT-LCD is formed by cell-assembling a TFT substrate and a color substrate (CF) and filling crystal. To protect the crystal from the contamination of outside environment, a frame sealant has been used to seal the TFT-LCD.

Current frame sealants are mainly classified as thermo-curable one and UV curable ones. The UV curable frame sealant has a short curing time and is fast for curing, but has poor controllability. Moreover, it is not suitable for special display modes, such as polymer dispersed liquid crystals (PDLC) or polymer stabilized cholesteric texture liquid crystals (PSCT), because a polymeric monomer sensitive to UV is contained in the liquid crystal cell, which can be sealed only through the thermo-curable frame sealants. Current thermo-curable frame sealants employ an external heat source, resulting in slow curing, long curing time, large energy lost, and a heat conduction gradient from external towards internal occurring during the process of curing. Moreover, current thermo-curable frame sealants are problematic in some aspects, such as uneven sealant breadth, retraction, and breakage. Defective curing would directly affect the quality of the panel, for example, poorly cured panel would present lightness mura in periphery. Therefore, there is a need for an improved thermo-curable frame sealant.

SUMMARY

An embodiment of the present invention provides a sealing method for a frame sealant, comprising:
successively coating a water-borne epoxy resin and a solvent-based epoxy resin on a first substrate,
aligning and pressing the first substrate and a second substrate; or
successively coating the solvent-based epoxy resin and the water-borne epoxy resin on a first substrate,
aligning and pressing the first substrate and a second substrate; or
coating the water-borne epoxy resin on a first substrate, coating the solvent-based epoxy resin on a second substrate, and aligning and pressing the two substrates;

a first material by which a nano-scale second material is encapsulated is dispersed in the solvent-based epoxy resin, wherein, the first material is a hydrophilic polymeric material and the second material is one which will undergo an exothermic reaction with water.

For example, said water-borne epoxy resin and said solvent-based epoxy resin both have a solid content of 60-70 wt %.

For example, the first material is an ester or an amide.
For example, the first material is a starch or a cellulose.
For example, the second material is a nanometer alkaline earth metal oxide.

For example, the nanometer alkaline earth metal oxide is a nanometer calcium oxide.

For example, the first material and the second material encapsulated by the first material are added in an amount of 10-20% by weight of the solvent-based epoxy resin.

A frame sealant comprises a water-borne epoxy resin and a solvent-based epoxy resin, a first material by which a nano-scale second material is encapsulated is dispersed in the solvent-based epoxy resin, wherein, the first material is a hydrophilic polymeric material and the second material is one which will undergo an exothermic reaction with water.

For example, said water-borne epoxy resin and said solvent-based epoxy resin both have a solid content of 60-70 wt %.

For example, the first material is an ester or an amide.
For example, the first material is a starch or a cellulose.
For example, the second material is a nanometer alkaline earth metal oxide.

For example, the nanometer alkaline earth metal oxide is a nanometer calcium oxide.

For example, the first material and the second material encapsulated by the first material are added in an amount of 10-20% by weight of the solvent-based epoxy resin.

A display panel is sealed through the sealing method for the frame sealant.

A display device comprises the display panel.

DETAILED DESCRIPTION

Figure 1:
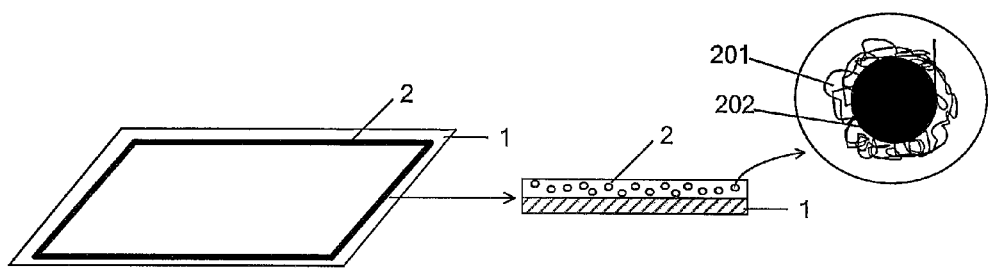
FIG. 1 is a schematic diagram of the substrate coated with the solvent-based epoxy resin according to the embodiment of the present invention.

The present invention will be further described by combining the Figures and specific embodiments. It is apparent that the described embodiments represent only a portion of, rather than all of the embodiments of the present invention. Based on the embodiments of the present invention, persons of ordinary skill in the art can obtain other embodiments without creative work, all of which are encompassed within the present invention.

An embodiment of the present invention provides a sealing method for a frame sealant, comprising:

successively coating a water-borne epoxy resin and a solvent-based epoxy resin on a first substrate, aligning and pressing the first substrate and a second substrate; or successively coating the solvent-based epoxy resin and the water-borne epoxy resin on a first substrate, aligning and pressing the first substrate and a second substrate; or coating the water-borne epoxy resin on a first substrate, coating the solvent-based epoxy resin on a second substrate, and aligning and pressing the two substrates;

a first material by which a nano-scale second material is encapsulated is dispersed in the solvent-based epoxy resin, wherein, the first material is a hydrophilic polymeric material and the second material is one which will undergo an exothermic reaction with water.

An embodiment of the present invention provides a frame sealant comprising a water-borne epoxy resin and a solvent-based epoxy resin, a first material by which a nano-scale second material is encapsulated is dispersed in the solvent-based epoxy resin, wherein, the first material is a hydrophilic polymeric material and the second material is one which will undergo an exothermic reaction with water.

When the solvent-based epoxy resin is pressed together with the water-borne epoxy resin, the first material by which the nano-scale second material is encapsulated will be dissolved into the water from the water-borne epoxy resin due to its water-solubility, such that the second material will be exposed to water. The second material will react with water in the form of an exothermic reaction to emit heat, which will cause the curing of the frame sealant.

The curing process of the frame sealants of the embodiments of the present invention is caused by an internal heat source, as compared to the frame sealants in the prior art. Thus, it can avoid the energy loss occurring in the prior curing process and increase the curing rate. Further, the second material encapsulated by the first material can be homogeneously dispersed in the solvent-based epoxy resin, and thus enhance the curing uniformity For example, both said water-borne epoxy resin and said solvent-based epoxy resin can have a solid content of 60-70 wt %. The proximity of the solid contents between the water-borne epoxy resin and the solvent-based epoxy resin will avoid poor sealing effect caused by difference in viscosity between them.

For example, the first material can be an ester or an amide.

For example, the first material can be a starch or a cellulose.

For example, the second material is a nanometer alkaline earth metal oxide.

For example, the second material can be a nanometer calcium oxide (CaO) or a nanometer magnesium oxide (MgO), preferably nanometer CaO.

For example, the first material and the second material encapsulated by the first material are added in an amount of 10-20% by weight of the solvent-based epoxy resin. When the addition amount is less than 10 wt %, the heat generated by the reaction of the second material with water is insufficient to cure the epoxy resin. When the addition amount is more than 20 wt %, the heat generated by the reaction of the second material with water may be in excess, possibly resulting in an excessive curing such that the cured frame sealant becomes aged.

Here, the solvent used in the solvent-based epoxy resin is an organic small molecule material commonly used in the curing of the frame sealant, such as acetone, propyl acetate, methyl amyl ketone, and the like.

Persons skilled in the art should appreciate that in addition to the water-borne epoxy resin and the solvent-based epoxy resin, the frame sealant further comprises other conventional components, such as a catalyst, which will not be described detailedly.

In an embodiment of the present invention, the first material is a starch, and the second material is a nanometer CaO. Nanometer CaO and the starch encapsulating nanometer CaO are added in an amount of 10-20% by weight of the solvent-based epoxy resin. Nanometer CaO encapsulated by the starch is homogeneously dispersed in the solvent-based epoxy resin.

When the frame sealant of the embodiment of the present invention is pressed, the starch will be dissolved into the water from the water-borne epoxy resin, such that nanometer CaO will be exposed to water and react with it to generate heat, thereby causing the curing of the frame sealant. Such a curing process can avoid the energy loss occurring in the prior curing process and increase the curing rate as well as curing uniformity. Further, thus-produced nanometer-scale calcium carbonate can serve as a supporting point to prevent the frame sealant from retracting and breaking, thereby enhancing the formability and strength of the frame sealant. Moreover, the reason to encapsulate nanometer CaO with starch is that starch is an excellent hydrophilic polymeric material and thus can act as a regulator between water and nanometer CaO, to avoid water to directly contact nanometer CaO and cause a vigorous reaction resulting in a sharp temperature elevation.

The solvent-based epoxy resin and the water-borne epoxy resin used are those known by persons skilled in the art for preparing a thermo-curable frame sealant. After reading the specification of the present invention, persons skilled in the art can easily select these solvent-based epoxy resins and water-borne epoxy resins for the purpose of the present invention. In the embodiments of the present invention, a first material by which a nano-scale second material is encapsulated is further dispersed in the solvent-based epoxy resin. Various dispersing processes well-known by persons skilled in the art can be used to disperse the nano-scale second material encapsulated by the first material into the solvent-based epoxy resin. For example, the solvent-based epoxy resin may be HC-1805 available from Mitsui, but is not limited thereto. The water-borne epoxy resin may be BONRON available from Mitsui, but is not limited thereto.

Figure 4:
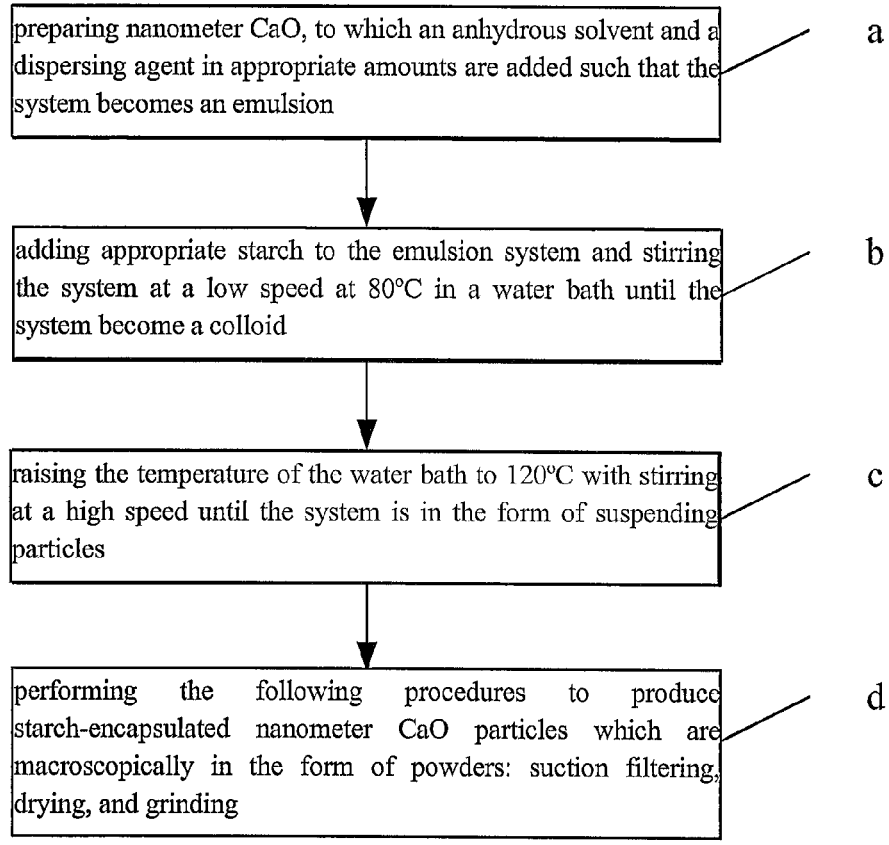
FIG. 4 is a flow chart showing the preparation of the starch-encapsulated nanometer CaO according to the embodiment of the present invention.

A method for preparing the starch-encapsulated nanometer CaO particles will be illustrated below. As shown in FIG. 4, the method comprises:

step a. preparing nanometer CaO, to which an anhydrous solvent and a dispersing agent in appropriate amounts are added such that the system becomes an emulsion;

step b. adding appropriate starch to the emulsion system and stirring the system at a low speed at 80° C. in a water bath until the system become a colloid;

step c. raising the temperature of the water bath to 120° C. with stirring at a high speed until the system is in the form of suspending particles;

step d. performing the following procedures to produce starch-encapsulated nanometer CaO particles which are macroscopically in the form of powders: suction filtering, drying, and grinding.

Here, the anhydrous solvent comprises anhydrous alcohols, anhydrous ketones, or anhydrous esters.

Here, the anhydrous alcohols can be an anhydrous ethanol

Here, the dispersing agent can be a silane coupling agent KH550.

The solvent-based epoxy resin of the embodiment of the present invention in which a second material encapsulated by a first material is dispersed is prepared as follows. At room temperature, anhydrous ethanol, an emulsifying agent, and the starch-encapsulated nanometer CaO are successively charged into a vessel containing the solvent-based epoxy resins. The mixture is treated for 60 min by ultra-sonication with vigorous stirring to make it disperse homogeneously. During the process of stirring, the system is warmed to 100° C. at ramp rate of 5° C./min. When a desired viscosity is reached, stirring is stopped and a sample is taken. The emulsifying agent used can be any one which is commonly used in the art for such purpose.

The application of the frame sealant of the embodiment of the present invention will be illustrated below, which mainly comprises a coating process and a curing process.

Coating Process

Figure 2:
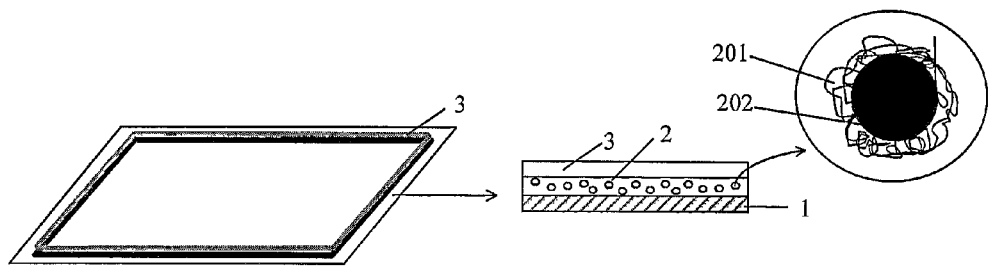
FIG. 2 is a schematic diagram of the substrate coated with the solvent-based epoxy resin and the water-borne epoxy resin that is to be pressed according to the embodiment of the present invention.

A double-funnel equipment is used. A water-borne epoxy resin (BONRON, manufactured by MITSU) is charged into one funnel and a solvent-based epoxy resin prepared according to the embodiment of the present invention is charged into the other funnel. The solvent-based epoxy resin (2) (as shown in FIG. 1) and then the water-borne epoxy resin (3) (as shown in FIG. 2) are coated on the a first substrate (1), wherein the solvent-based epoxy resin (2) comprises nanometer CaO (202) encapsulated by starch (201). As an alternative coating process, the first substrate (1) can be first coated with the water-borne epoxy resin (3) and then coated with the solvent-based epoxy resin (2). Alternatively, the first substrate (1) can be coated with the water-borne epoxy resin (3) (or the solvent-based epoxy resin (2)), and a second substrate (4) can be coated with the solvent-based epoxy resin (2) (or the water-borne epoxy resin (3)). Here, the first substrate (1) and the second substrate (4) can be any one of the array substrate and the color substrate, and it is not intended that the first substrate (1) refers to the array substrate or the color substrate.

Curing Process

Figure 3:
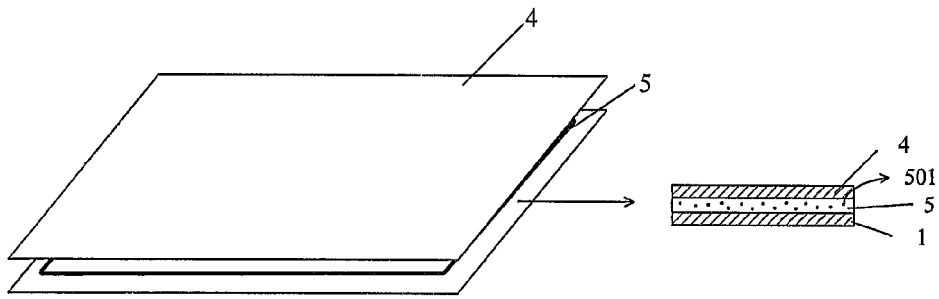
FIG. 3 is a schematic diagram of the frame sealant that has been pressed and cured according to the embodiment of the present invention.

The second substrate (4) and the first substrate (1) are aligned and pressed by a flat-plate pressing machine, which has flat rubber gaskets at both sides thereof. Upon pressing, the water-borne epoxy resin (3) and the solvent-based epoxy resin (2) are admixed with each other. Water in the water-borne epoxy resin (3) is absorbed by starch. Since the layer of the starch is thin and there is much water, the remaining water after the starch has been saturated will enter the layer of nanometer CaO, where nanometer CaO reacts with water to generate heat. The reacting sites are homogeneously distributed inside the matrix of the epoxy resin, resulting in a homogeneous internal curing. FIG. 3 shows a cured frame sealant (5) and the resulting nanometer $CaCO_3$ (501). Thus-produced nanometer $CaCO_3$ can serve as a supporting point to prevent the frame sealant from retracting and breaking, thereby enhancing the formability and strength of the frame sealant.

Furthermore, the temperature inside the epoxy resin can be detected through a temperature detector. When the temperature is below 150° C., an external heat source will be opened to supplement heat such that the temperature can arrive at a set temperature such as 150° C. and keep for 1-5 min.

When the heat from the reaction of CaO with water is useful for curing, a homogeneous heating occurs inside the epoxy resin, which not only can avoid heat loss often occurring in the prior art employing an external heat source, eliminate the heat gradient, but also increase the curing rate and curing uniformity.

In the liquid crystal display which has been sealed by the frame sealants of the embodiments of the present invention, the frame sealant is cured homogeneously, with uniform breadth and thinness of sealant. The defects, such as light leak, crystal leak and mura are significantly reduced. The frame sealant also achieved better forming stability and strength. Meanwhile, the resulting liquid crystal display can apply to the display mode that can not use a UV curing. The internal heat source is environmentally friendly, saves energy, imparts a faster curing, and promotes mass production.

A first example will be illustrated by combining the figures.

A frame sealant comprises, a water-borne epoxy resin; and a solvent-based epoxy resin, said solvent-based epoxy resin comprises nanometer CaO encapsulated by starch, and nanometer CaO is homogeneously dispersed in the solvent-based epoxy resin.

A sealing method for the frame sealant, comprising:

successively coating a water-borne epoxy resin and a solvent-based epoxy resin on a first substrate, aligning and pressing the first substrate and a second substrate; or successively coating the solvent-based epoxy resin and the water-borne epoxy resin on a first substrate, aligning and pressing the first substrate and a second substrate; or coating the water-borne epoxy resin on a first substrate, coating the solvent-based epoxy resin on a second substrate, and aligning and pressing the two substrates.

Both said water-borne epoxy resin and said solvent-based epoxy resin have a solid content of 65 wt %. The proximity of the solid contents between the water-borne epoxy resin and the solvent-based epoxy resin will avoid poor sealing effect caused by difference in viscosity between them.

The total addition amount of the starch and nanometer CaO encapsulated by it comprises 15% by weight of the solvent-based epoxy resin.

When the frame sealant of the embodiment of the present invention is pressed, the starch will be dissolved into the water from the water-borne epoxy resin, such that nanometer CaO will be exposed to water and react with it to generate heat, thereby causing the curing of the frame sealant. Such a curing process can avoid the energy loss occurring in the prior curing process and increase the curing rate as well as curing uniformity. Further, thus-produced nanometer-scale calcium carbonate can serve as a supporting point to prevent the frame sealant from retracting and breaking, thereby enhancing the formability and strength of the frame sealant. Moreover, the reason to encapsulate nanometer CaO with starch is that starch is an excellent hydrophilic polymeric material and thus can act as a regulator between water and nanometer CaO, to avoid water to directly contact nanometer CaO and cause a vigorous reaction resulting in a sharp temperature elevation.

A method for preparing the starch-encapsulated nanometer CaO particles will be illustrated below. As shown in FIG. 4, the method comprises:

step a. preparing nanometer CaO, to which an anhydrous ethanol and a silane coupling agent KH550 in appropriate amounts are added such that the system becomes an emulsion;

step b. adding appropriate starch to the emulsion system and stirring the system at a low speed at 80° C. in a water bath until the system become a colloid;

step c. raising the temperature of the water bath to 120° C. with stirring at a high speed until the system is in the form of suspending particles;

step d. performing the following procedures to produce starch-encapsulated nanometer CaO particles which are macroscopically in the form of powders: suction filtering, drying, and grinding.

The solvent-based epoxy resin of the embodiment of the present invention in which a second material encapsulated by a first material is dispersed is prepared as follows. At room temperature, anhydrous ethanol, an emulsifying agent (Monoglycerides HP-C, available from Dupont), and the starch-encapsulated nanometer CaO as prepared above are successively charged into a vessel containing the solvent-based epoxy resins (HC-1850 available from MITSUI). The mixture is treated for 60 min by ultrasonication with vigorous stirring to make it disperse homogeneously. During the process of stirring, the system is warmed to 100° C. at ramp rate of 5° C./min. When a desired viscosity is reached, stirring is stopped and a sample is taken. The application of the frame sealant of the embodiment of the present invention will be illustrated below, which mainly comprises a coating process and a curing process.

Coating Process

A double-funnel equipment is used. A water-borne epoxy resin (BONRON, manufactured by MITSU) is charged into one funnel and a solvent-based epoxy resin prepared according to the embodiment of the present invention is charged into the other funnel. The solvent-based epoxy resin (2) (as shown in FIG. 1) and then the water-borne epoxy resin (3) (as shown in FIG. 2) are coated on the a first substrate (1), wherein the solvent-based epoxy resin (2) comprises nanometer CaO (202) encapsulated by starch (201). As an alternative coating process, the first substrate (1) can be first coated with the water-borne epoxy resin (3) and then coated with the solvent-based epoxy resin (2). Alternatively, the first substrate (1) can be coated with the water-borne epoxy resin (3) (or the solvent-based epoxy resin (2)), and a second substrate (4) can be coated with the solvent-based epoxy resin (2) (or the water-borne epoxy resin (3)).

Curing Process

The second substrate (4) and the first substrate (1) are aligned and pressed by a flat-plate pressing machine, which has flat rubber gaskets at both sides thereof. Upon pressing, the water-borne epoxy resin (3) and the solvent-based epoxy resin (2) are admixed with each other. Water in the water-borne epoxy resin (3) is absorbed by starch. Since the layer of the starch is thin and there is much water, the remaining water after the starch has been saturated will enter the layer of nanometer CaO, where nanometer CaO reacts with water to generate heat. The reacting sites are homogeneously distributed inside the matrix of the epoxy resin, resulting in a homogeneous internal curing. FIG. 3 shows a cured frame sealant (5) and the resulting nanometer $CaCO_3$ (501). Thus-produced nanometer $CaCO_3$ can serve as a supporting point to prevent the frame sealant from retracting and breaking, thereby enhancing the formability and strength of the frame sealant.

Furthermore, the temperature inside the epoxy resin can be detected through a temperature detector. When the temperature is below 150° C., an external heat source will be opened to supplement heat such that the temperature can arrive at a set temperature such as 150° C. and keep for 1-5 min.

When the heat from the reaction of CaO with water is useful for curing, a homogeneous heating occurs inside the epoxy resin, which not only can avoid heat loss often occurring in the prior art employing an external heat source, eliminate the heat gradient, but also increase the curing rate and curing uniformity.

In the liquid crystal display which has been sealed by the frame sealants of the embodiments of the present invention, the frame sealant is cured homogeneously, with uniform breadth and thinness of sealant. The defects, such as light leak, crystal leak and mura are significantly reduced. The frame sealant also achieved better forming stability and strength. Meanwhile, the resulting liquid crystal display can apply to the display mode that can not use a UV curing. The internal heat source is environmentally friendly, saves energy, imparts a faster curing, and promotes mass production.

A second example is substantively the same as the first example, except that both said water-borne epoxy resin and said solvent-based epoxy resin have a solid content of 60 wt % and the addition amount of starch and nanometer CaO is 10 wt %.

A third example is substantively the same as the first example, except that both said water-borne epoxy resin and said solvent-based epoxy resin have a solid content of 70 wt % and the addition amount of starch and nanometer CaO is 20 wt %.

Additionally, it should be understood that in other examples where a different second material is encapsulated by a different first material (such as the examples involving starch-encapsulated nanometer MgO, cellulose-encapsulated nanometer CaO, cellulose-encapsulated nanometer MgO), the curing of the frame sealant is also performed through an internal heat source similar to the example using starch-encapsulated nanometer CaO, which will not be stated detailedly.

An example of the present invention further provides a display panel, which is sealed through the sealing method of the frame sealant.

An example of the present invention further provides a display device comprising the display panel.

The display device can be selected from the group consisting of: a liquid crystal display panel, an organic light emitting diode (OLED) panel, a cell phone, a tablet PC, a TV, a display, a laptop, a digital photo frame, a navigator, electric paper, and any display product or device which has cell-assembled substrates.

The present invention has been described through some preferred embodiments, which are not intended to limit the protection scope of the present invention.

The invention claimed is:

1. A sealing method for a frame sealant, comprising:
   successively coating a water-borne epoxy resin and a solvent-based epoxy resin on a first substrate, aligning and pressing the first substrate and a second substrate; or
   successively coating the solvent-based epoxy resin and the water-borne epoxy resin on a first substrate, aligning and pressing the first substrate and a second substrate; or
   coating the water-borne epoxy resin on a first substrate, coating the solvent-based epoxy resin on a second substrate, and aligning and pressing the two substrates;
   a first material by which a nano-scale second material is encapsulated is dispersed in the solvent-based epoxy resin, wherein the first material is a hydrophilic polymeric material and the second material is one which will undergo an exothermic reaction with water.

2. The sealing method for a frame sealant according to claim 1, wherein said water-borne epoxy resin and said solvent-based epoxy resin both have a solid content of 60-70 wt %.

3. The sealing method for a frame sealant according to claim 1, wherein the first material is an ester or an amide.

4. The sealing method for a frame sealant according to claim 1, wherein the first material is a starch or a cellulose.

5. The sealing method for a frame sealant according to claim 1, wherein the second material is a nanometer alkaline earth metal oxide.

6. The sealing method for a frame sealant according to claim 5, wherein the nanometer alkaline earth metal oxide is a nanometer calcium oxide.

7. The sealing method for a frame sealant according to claim 1, wherein the first material and the second material encapsulated by the first material are added in an amount of 10-20% by weight of the solvent-based epoxy resin.

8. A frame sealant comprising a water-borne epoxy resin and a solvent-based epoxy resin,
a first material by which a nano-scale second material is encapsulated is dispersed in the solvent-based epoxy resin, wherein, the first material is a hydrophilic polymeric material and the second material is one which will undergo an exothermic reaction with water,
wherein the water-borne epoxy resin and the solvent-based epoxy resin are successively added and not in one mixture composition.

9. The frame sealant according to claim 8, wherein said water-borne epoxy resin and said solvent-based epoxy resin have a solid content of 60-70 wt %.

10. The frame sealant according to claim 8, wherein the first material is an ester or an amide.

11. The frame sealant according to claim 8, wherein the first material is a starch or a cellulose.

12. The frame sealant according to claim 8, wherein the second material is a nanometer alkaline earth metal oxide.

13. The frame sealant according to claim 12, wherein the nanometer alkaline earth metal oxide is a nanometer calcium oxide.

14. The frame sealant according to claim 8, wherein the first material and the second material encapsulated by the first material are added in an amount of 10-20% by weight of the solvent-based epoxy resin.

\* \* \* \* \*